United States Patent [19]

Wheeler et al.

[11] 4,266,618

[45] May 12, 1981

[54] ARTICULATED PLOW WITH CENTRAL SUPPORT PROVIDING COUNTER MOMENT FOR REAR SECTION

[75] Inventors: Keith A. Wheeler; Dawson W. Hastings, both of La Porte, Ind.

[73] Assignee: Allis-Chalmers Corporation, Milwaukee, Wis.

[21] Appl. No.: 72,422

[22] Filed: Sep. 4, 1979

[51] Int. Cl.³ .............................................. A01B 15/14
[52] U.S. Cl. .................................... 172/314; 172/633; 280/411 C
[58] Field of Search ...................... 172/310, 314, 633; 280/411 C

[56] References Cited

U.S. PATENT DOCUMENTS

| | | | |
|---|---|---|---|
| 3,965,989 | 6/1976 | Ward | 172/310 |
| 4,036,306 | 7/1977 | Kinzenbaw | 172/310 X |
| 4,121,852 | 10/1978 | Quanbeck | 172/314 X |

Primary Examiner—Richard T. Stouffer

[57] ABSTRACT

An articulated plow has a front section 12 supported at its front end by a ground engaging furrow wheel 19, a rear section 13 supported at its rear end by a ground engaging furrow wheel 22, pivot joints 32, 33 interconnecting the diagonally disposed frames 14, 16 of the end-to-end front and rear sections 12, 13 on a transverse articulation axis 31 and central support wheels 23, 24 which contact the ground forwardly of the articulation axis 31 to produce a counter moment acting on the rear section 13 to counteract the tendency of the rear plow bottoms to operate at a reduced plowing depth.

8 Claims, 6 Drawing Figures

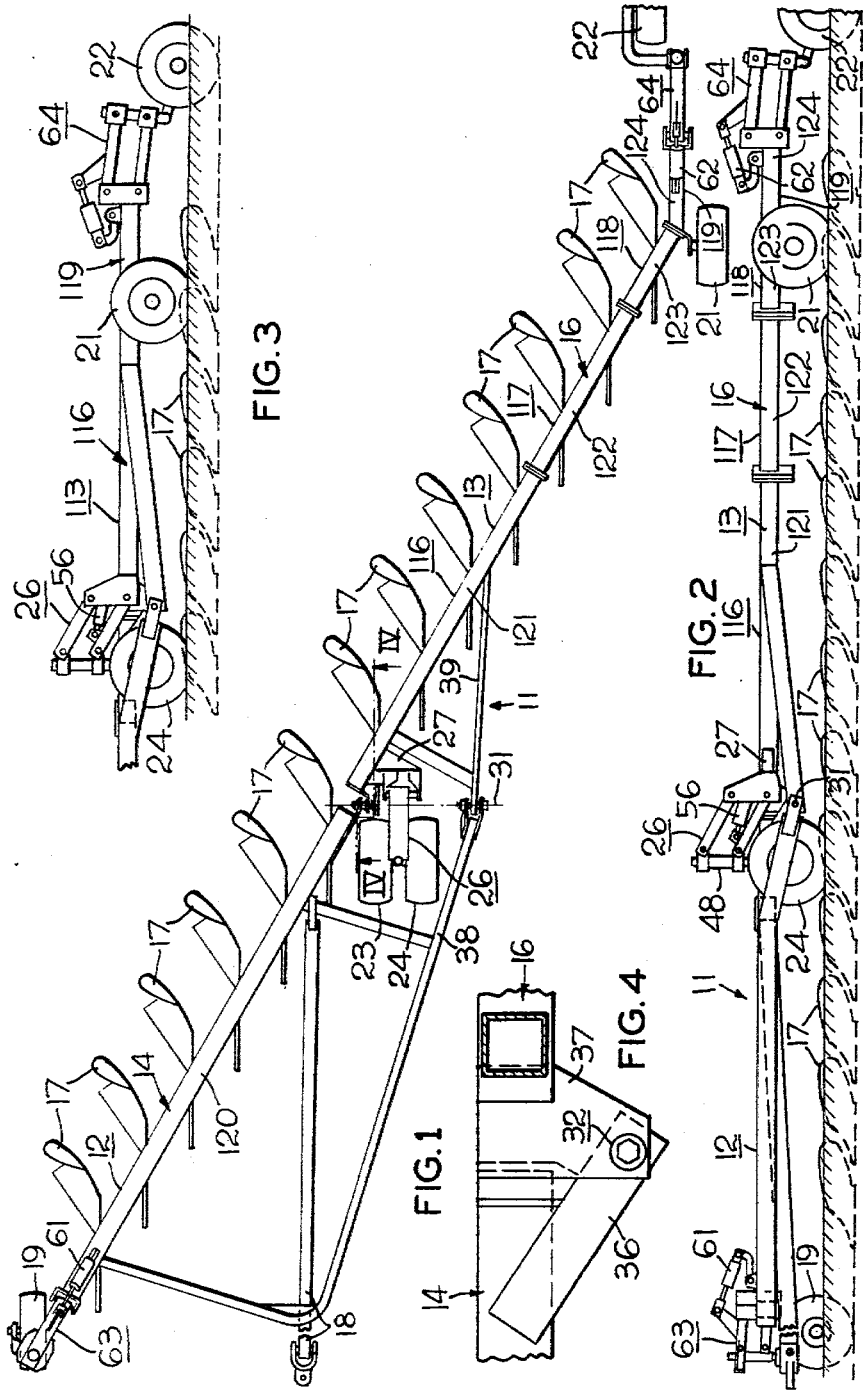

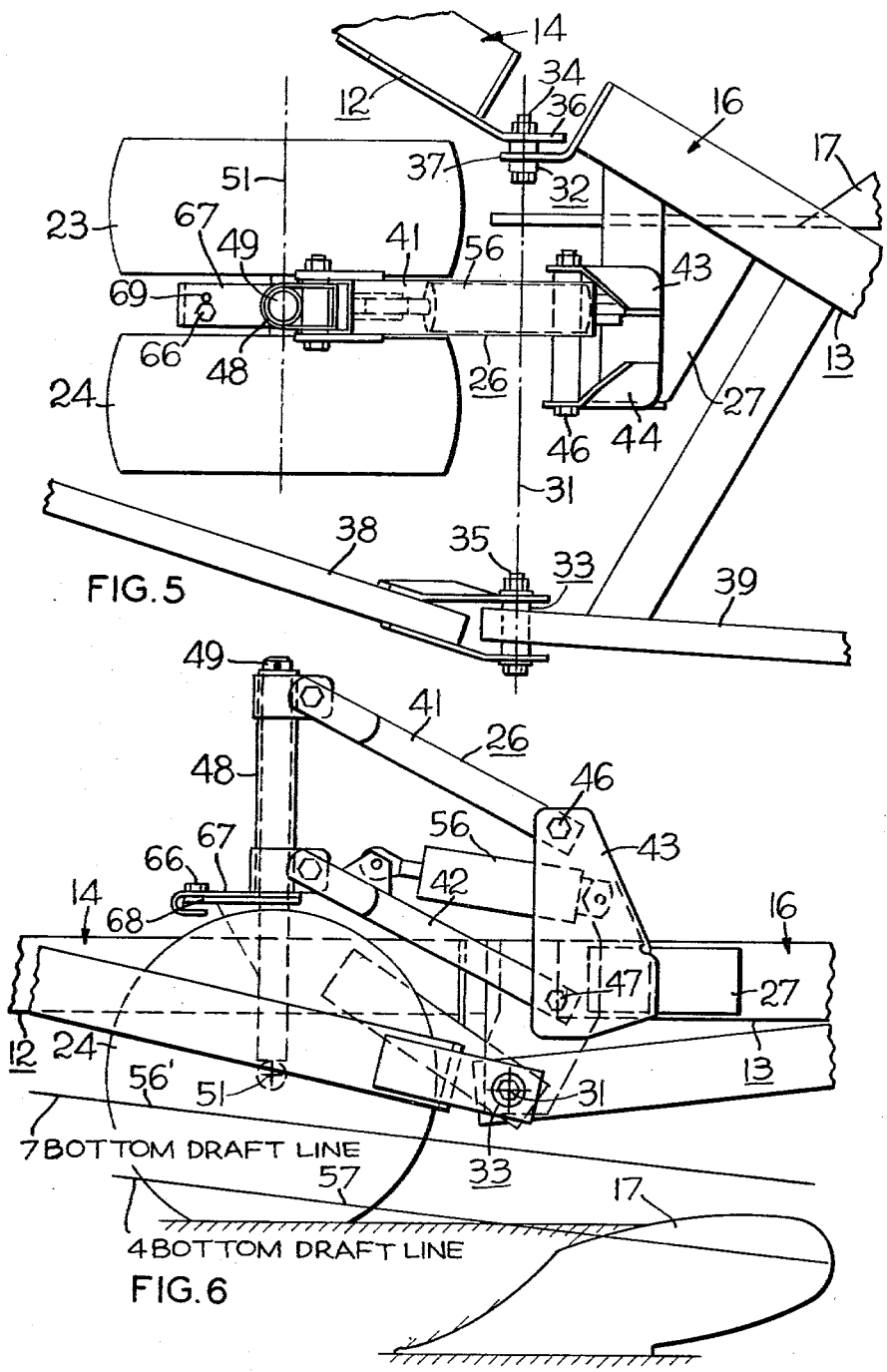

ARTICULATED PLOW WITH CENTRAL SUPPORT PROVIDING COUNTER MOMENT FOR REAR SECTION

TECHNICAL FIELD

This invention relates to an articulated plow having front and rear sections with diagonal frames pivotally connected on a horizontal transverse articulation axis and more particularly to the provision of a central wheeled support which provides a counter moment counteracting the tendency of the rearmost plow bottoms to operate at a reduced depth.

BACKGROUND OF THE INVENTION

Heretofore, various articulated plows have been suggested and used for agricultural purposes wherein front and rear plow frame sections articulate about a transverse axis to maintain a reasonable depth of plowing as the plow traverses uneven ground contour. Typical of such articulated plows are those illustrated in U.S. Pat. Nos. 3,965,989; 4,036,306; 4,049,063; 4,121,852 and 1,446,118.

The width of cut of a particular articulated plow can be varied by adding or removing segments from the rear section of the plow. For instance, a rear plow section may comprise three segments rigidly bolted together which have 1, 2 and 4 bottoms respectively. By using various combinations of these segments the rear section of the plow can be constructed to have 4, 5, 6 or 7 plow bottoms. When using relatively short rear sections, such as those having 4 or 5 plow bottoms, there is a noticeable tendency for the rearmost plow bottoms to operate at a lesser depth. This tendency is due to the line of pull of the rear plow section passing a substantial distance below the transverse articulation axis, which reduces the downward force on the rear most bottoms. The present invention is directed at reducing the tendency of the rearmost plow bottom to operate at a reduced depth, as compared to the depth of operation of the other plow bottoms on the rear plow section.

BRIEF DESCRIPTION OF THE INVENTION

The invention may be incorporated in an articulated plow having end-to-end front and rear sections with adjacent ends of their diagonal frames joined together for articulation about a transverse pivot axis. In order to reduce the tendency of the rearmost plow bottoms on the rear section to operate at a reduced depth as compared to the other bottoms on the rear section, a central ground engaging support wheel, or wheels, is mounted on the front end of the rear section and positioned to contact the ground forwardly of the transverse pivot axis about which the sections articulate.

BRIEF DESCRIPTION OF THE DRAWINGS

The invention is illustrated by drawings in which:

FIG. 1 is a top view of an articulated plow incorporating the present invention;

FIG. 2 is a side view of the plow shown in FIG. 1;

FIG. 3 is a partial side view of a modified rear section of an articulated plow incorporating the present invention;

FIG. 4 is a sectional view taken on the line IV—IV in FIG. 1;

FIG. 5 is an enlarged top view of the central wheel support and articulation connection; and FIG. 6 is an enlarged side view of the structure shown in FIG. 5.

DETAILED DESCRIPTION OF THE INVENTION

Referring to FIGS. 1 and 2, an articulated plow 11 includes a front section 12 and a rear section 13 having end-to-end diagonal main frames 14, 16. Plow bottoms 17 are rigidly mounted at predetermined intervals on diagonal beam 120 of the front main frame 14 and to the diagonal beam components 121, 122, 123 of the main frame 16. The plow bottoms 17 are identical in construction and are each secured to their respective frames 14, 16 by identical fastening means. Thus, the plow bottoms have the same horizontal angle relationship to their frames. A pull bar 18 is provided on the plow 11 for connecting same in draft relation to a tractor (not shown). The pull bar 18 is connected to the tractor draw bar by a vertical pivot pin (not shown). The front of the front section 12 is supported by a suitable ground engaging front furrow wheel 19. The rear of the rear section 13 is supported by a land engaging wheel 21 and by a ground engaging rear furrow wheel 22. The central part of the articulated plow 11 is supported by a central support including ground engaging dual wheels 23, 24 carried by a wheel support structure including a parallel linkage 26 mounted on a bracket structure 27 on the front of the rear section 13. The front and rear sections 12, 13 are connected to one another on a horizontal transverse pivot axis 31 by laterally spaced pivot joints 32, 33.

Referring also to FIGS. 4, 5 and 6, the pivot joint 32 includes a pivot pin 34 pivotally interconnecting a bracket 36 welded to the rear end of the front frame 14 and a bracket 37 welded to the front end of rear frame 16. The pivot joint 33 includes a pivot pin 35 interconnecting a draft frame member 38 on the front section 12 to a draft frame member 39 on the rear section 13. The pivot pins 34, 35 are concentric and establish the horizontal transverse articulation axis 31 between the front and rear sections 12, 13. The parallel linkage 26 for mounting the ground engaging central wheels 23, 24 on the frame 16 of the rear plow section 13 includes upper and lower vertically spaced links 41, 42 which have their rear ends pivotally connected to laterally spaced flanges 43, 44 of the mounting bracket 27 by parallel pivot pins 46, 47. The front of the links 41, 42 are pivotally connected to a king pin housing 48, of the wheel support structure, in which a king pin 49 is journaled. The wheels 23, 24 are journaled on stub axles extending in opposite lateral directions from the lower end of the king pin 49. The wheels 23, 24 may be adjusted vertically relative to the rear plow section 13, so as to raise and lower the central portion of the plow 11, by actuation of an adjustment means in the form of a double acting hydraulic jack 56 having its opposite ends pivotally connected, respectively, to link 42 and bracket 27.

It will be noted that the axis 51 of the dual wheels 23, 24 is disposed forwardly of the articulation axis 31 a distance greater than the radius of the wheels 23, 24. In other words, the wheels 23, 24 engage the ground a predetermined distance forwardly of the articulation axis 31. This provides a counter moment resisting the tendency of the rearmost plow bottoms to "ride up" and operate at a lesser depth than the other bottoms on the rear section. The tendency of the rear end of the rear plow section 13 to operate at a lesser depth than the other bottoms thereon is related to the line of draft or pull of the rear plow section 13. The rear plow section 13 in the embodiment of the invention illustrated in FIGS. 1 and 2 has seven bottoms 17. The rear section 13 is actually made up of three plow supporting segments 116, 117, 118 to which 4, 2 and 1 plow bottoms 17 are attached and a tail segment 119. The segments 116, 117, 118, 119 include tubular frame members 121, 122, 123, 124 which are rigidly secured to one another by releasable fasteners such as nuts and bolts, not shown. The line of draft for the 7 bottom rear section 13 is represented by line 56' in FIG. 6. The rear plow section 113 illustrated in FIG. 3 is comprised of the lead segment 116 and the tail segment 119. The line of draft of the 4 bottom rear plow section 113, as shown in FIG. 6 by line 57, will drop to a lower point level below the articulation axis 31 thus increasing the forces acting on the rear section bottoms which cause the rearmost bottoms to operate at a reduced depth as compared to the other bottoms on the rear plow section 116. As is readily apparent, the rear plow section may contain 7, 6, 5 or 4 plow bottoms depending on which segments are selected.

As illustrated, the plow is operating at its maximum plowing depth. When it is desired to raise the plow to a transport position the hydraulic jacks 56, 61, 62 are actuated (extended) to cause the plow frames 14, 16 to be raised. The parallel linkages 63, 64 support or mount the ground engaging furrow wheels 19, 22 in a manner somewhat similar to the manner in which linkage 26 supports the central support wheels 23, 24. During a plowing operation the king pin housing 48 is secured to the king pin 49 by a cap screw 66 fastening a flange 67 of the housing 48 to a flange 68 of the king pin 49. In this condition, the axis 51 of the central support wheels is parallel to the articulation axis 31. During transport the cap screw occupies an alternate opening 69 in flange 67 and the wheels are shifted slightly clockwise as viewed in FIG. 5.

The embodiments of the invention in which an exclusive property or privilege is claimed are defined as follows:

1. An articulated plow comprising
   a front section having a diagonal main frame with plow bottoms connected thereto at predetermined intervals,
   a rear section having its front end pivotally connected to the rear end of said front section on a transverse horizontal axis and having a diagonal main frame with plow bottoms connected thereto at predetermined intervals,
   a first ground engaging wheel connected in supporting relation to the front end of said front section,
   a second ground engaging wheel connected in supporting relation to the rear end of said rear section,
   a wheel support structure connected to the front end of said rear section for vertical adjustment relative thereto,
   a third ground engaging wheel rotatably mounted on said wheel support structure and engaging the ground forwardly of said transverse horizontal axis and
   adjustment means operatively interposed between said rear section and said wheel support structure operable to vertically adjust and fix the position of the latter relative to said rear section, the position of said third wheel and the gravitational force imposed by the rear end of said front section on the front end of said rear section through the pivot connection between said sections providing a counter moment resisting upward swinging movement of said rear section about said transverse horizontal axis.

2. The plow of claim 1 wherein said wheels are vertically adjustable to raise and lower said plow sections between transport and plowing positions.

3. The plow of claim 1 wherein said adjustment means includes a hydraulic jack having one of its ends connected to said rear plow section and its other end connected to said wheel support structure.

4. The plow of claim 1 wherein said wheel support structure includes a parallel linkage with two links having the rear ends pivotally connected to said rear plow section and wherein said adjustment means includes a hydraulic jack having one of its ends connected to said rear plow section and its other end connected to said wheel support structure.

5. An articulated plow having end-to-end front and rear sections each having a diagonal main frame with plow bottoms connected thereto at predetermined intervals, an articulation joint connecting the adjacent ends of the frames on a horizontal transverse articulation axis, front and rear ground engaging wheels connected, respectively, in supporting relation to the front end of said front section and to the rear end of the rear section, characterized by
   a central ground engaging wheel rotatably mounted on the front end of said rear section by means fixing said central ground engaging wheel to move with said rear section about said articulation axis about said articulation axis, said central ground engaging wheel engaging the ground a predetermined distance forwardly of said transverse articulation axis whereby the rear plow section is subjected to a counter moment.

6. The plow of claim 5 wherein said central wheel is supported on the front end of said rear frame by a mounting structure including a bracket rigidly secured to the front end of said rear section, a forwardly extending link pivotally connected at its rear end to said bracket for vertical swinging movement about a horizontal pivot axis, a wheel axle and means connecting said axle to the forward end of said link and further comprising a hydraulic jack between said link and said rear section selectively operable to pivot said link about said horizontal pivot axis and maintain said link in a selected position to which adjusted.

7. The plow of claim 5 wherein the axis of said central ground engaging wheel is disposed forwardly of the axis of said articulation connection a distance exceeding the radius of said central ground engaging wheel.

8. The plow claim 5 wherein said central ground engaging wheel is in supporting relation to the front of said rear section and the rear of said front section and wherein the upward movement of the rear section about the central ground engaging wheel contact with the ground is resisted by the downward gravitational force applied by the rear end of the front section to the front end of the rear section through said articulation joint.

* * * * *